United States Patent [19]
Bourgraf et al.

[11] 3,918,554
[45] Nov. 11, 1975

[54] CRASH STABLE COT FASTENER

[75] Inventors: Elroy E. Bourgraf, Cincinnati;
Robert E. Dunn, Bloomingburg;
Kenneth R. Self, Washington Court House, all of Ohio

[73] Assignee: Ferno-Washington, Inc., Wilmington, Ohio

[22] Filed: Sept. 30, 1974

[21] Appl. No.: 510,806

[52] U.S. Cl. .................................. 188/32; 296/19
[51] Int. Cl.² ........................................... B60T 1/14
[58] Field of Search ............... 188/2 R, 32, 62, 111; 296/19

[56] References Cited
UNITED STATES PATENTS

| | | | |
|---|---|---|---|
| 2,303,618 | 12/1942 | Couleur | 188/32 X |
| 3,221,907 | 12/1965 | O'Sullivan | 188/32 X |
| 3,425,517 | 2/1969 | Speir | 188/32 |

*Primary Examiner*—Duane A. Reger
*Attorney, Agent, or Firm*—Melville, Strasser, Foster & Hoffman

[57] ABSTRACT

Cot holding means for use in ambulances comprising a pair of cot-engaging devices recessed in the floor of the ambulance, the devices each having a retractable arm mounting rollers which engage wing-like fittings adjustably mounted on the opposite ends of the cot undercarriage, each arm being connected to linkage means having a retractable handle for moving the arms from one position to the other, together with latch means for securely fastening the arms in cot-engaging position.

19 Claims, 8 Drawing Figures

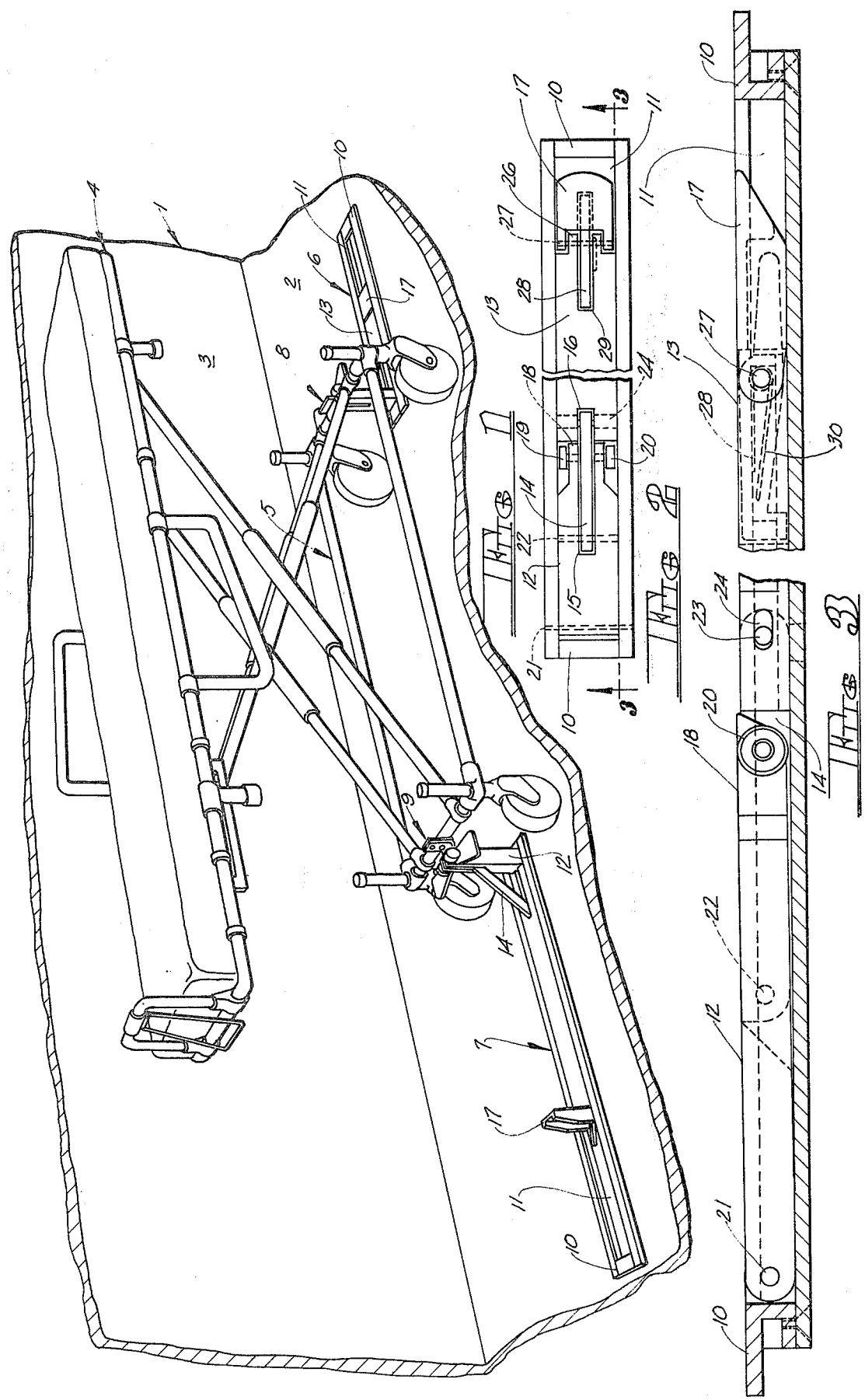

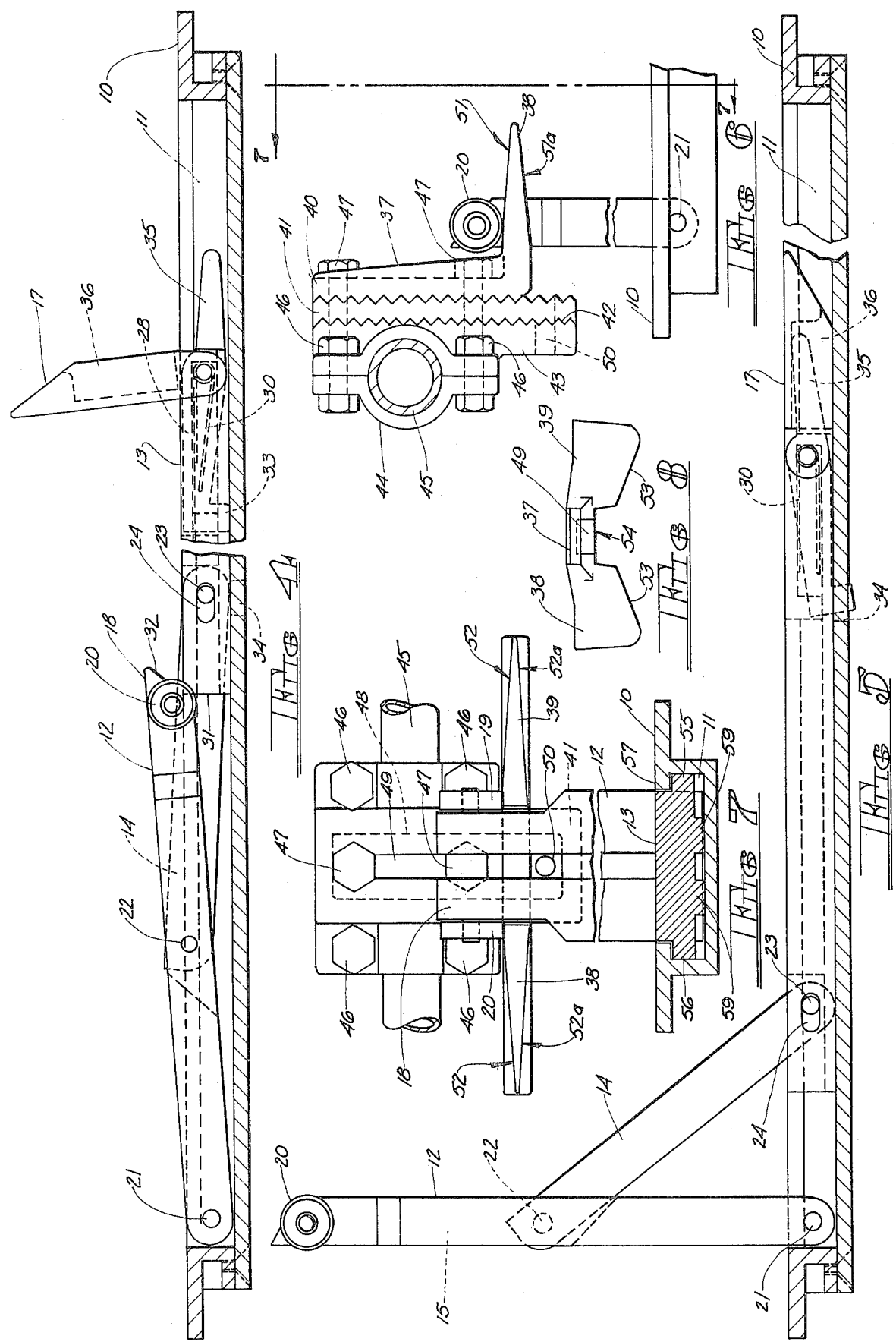

CRASH STABLE COT FASTENER

BACKGROUND OF THE INVENTION

It is common practice to provide vehicles, such as ambulances and hearses, with fastening devices for securing a cot in fixed position in the vehicle. The conventional ambulance cot is mounted on a rectangular undercarriage having wheels at its corners, and most of the cot holding devices are mounted on the side of the vehicle and arranged to engage one side of the undercarriage. Such side-mounted holding devices are difficult to engage and disengage, particularly when working from the rear of the ambulance or in the dark, and since the devices project outwardly from the wall they often interfere with the movement of the cot during loading and unloading. In addition, the side fastening devices are not crash stable should the vehicle be turned over in an accident.

Attempts have also been made to provide floor-mounted fastening devices, but such devices have been unsatisfactory. They are difficult to operate and protrude from the floor of the vehicle and hence interfere with other uses of the vehicle as well as presenting a tripping hazard.

In contrast to the foregoing, the present invention provides cot holding devices which are free from the above enumerated difficulties, the devices being fully recessed in the vehicle floor when not in use, yet quickly and easily manipulated to positively lock the cot in place and secure it against movement even if the vehicle is turned over during an accident.

SUMMARY OF THE INVENTION

In accordance with the invention, an improved cot holding means is provided which comprises a pair of essentially identical cot engaging devices, although preferably the rearmost device will have a longer actuating link to facilitate manipulation from the rear of the ambulance, as where the attendant is standing outside the rear door.

Each of the devices comprises a channel-shaped housing adapted to be recessed in the floor of the vehicle. A retractable arm is pivotally mounted in the channel, and the channel also receives the linkage mechanism by means of which the arm is raised and lowered. The linkage mechanism comprises an elongated link member which is axially slidable in the channel, the link member having a retractable handle at its rearmost end which overlies and covers a spring-biased latch member adapted to engage a slot in the channel when the locking arm is moved to its extended position. Movement of the locking arm from its retracted to its extended position is effected by axial movement of the elongated link member which initially cams the locking arm to a slightly inclined position, whereupon a second link member or brace, which is pivotally connected at one end to the elongated link member and at its opposite end to the locking arm, acts to move the locking arm to its fully extended position as the elongated link member is moved axially along the channel. The latch member automatically engages an opening in the channel when the locking arm reaches the fully erected position, thereby locking the parts in place. The locking arm is retracted by releasing the latch and moving the elongated link member in the opposite direction.

In operation, the front cot-engaging device, i.e., the one toward the front of the ambulance, preferably will be erected prior to rolling the cot into the ambulance. The cot will then be placed in the ambulance and rolled toward the front locking device until a wing-like fitting mounted on the leading side of the cot undercarriage engages beneath a pair of rollers carried on the locking arm. The configuration of the wing-like fitting is such that the cot will be automatically centered with respect to the locking arm. In effect, the wings act as cam surfaces which, when engaged by the rollers on the locking arm, guide the cot into locking engagement with the locking arm. When the cot is engaged with the front device, the attendant then extends the locking arm on the rear device which is positioned so that the rear locking arm, when extended, will engage a wing-like fitting mounted on the trailing side of the undercarriage. As the rear locking arm moves to the erected position, its rollers will engage over the wings of the fitting, and a self-centering action takes place, the wings acting against the rollers on the locking arm to position the cot and lock it in place. When both locking arms are in engagement with the fittings on the undercarriage, the cot is effectively clamped in fixed position and cannot move in any direction.

When it is desired to remove the cot, the attendant has but to reach in to the ambulance from the rear door, raise the handle on the elongated link member, release the latch and pull the elongated link member rearwardly by its handle, thereby retracting the rear locking arm and releasing the cot. The attendant has then only to move the cot rearwardly to release it from the front device.

The wing-like fixtures mounted on the undercarriage are vertically adjustable and even reversible so as to readily accommodate cots with varying wheel sizes.

DESCRIPTION OF THE DRAWINGS

FIG. 1 is a perspective view with parts broken away illustrating the cot holding devices mounted in a vehicle and in engagement with a typical ambulance cot.

FIG. 2 is a plan view of the cot fastening device in the retracted position.

FIG. 3 is an enlarged vertical sectional view taken along the line 3—3 of FIG. 2.

FIG. 4 is a vertical sectional view similar to FIG. 3 but illustrating the handle in elevated condition and the elongated link member in camming engagement with the locking arm.

FIG. 5 is a vertical sectional view similar to FIG. 4 but illustrating the parts in the fully erected condition.

FIG. 6 is a side elevational view illustrating the details of the wing-like fitting engaged by the locking arm.

FIG. 7 is a vertical sectional view taken along the lines 7—7 of FIG. 6.

FIG. 8 is a plan view, on reduced scale, of the fitting wings.

DESCRIPTION OF THE PREFERRED EMBODIMENT

Referring first to FIG. 1 of the drawings, the body of an ambulance or similar vehicle is indicated generally at 1, the body having a floor 2 and an adjoining side 3. A typical ambulance cot is indicated at 4, the cot having an undercarriage 5 secured to the floor 2 by means of front locking device 6 and rear locking device 7, the undercarriage 5 being provided at its front and rear ends with wing-like fixtures 8 and 9, respectively, which are engaged by the locking devices when in the erected condition.

The basic components of the locking devices 6 and 7 are identical, although it is preferred that the rear locking device 7 be longer, i.e., have a longer actuating link so that it may be readily operated by an attendant standing outside the ambulance.

Each device comprises a channel-shaped housing or frame 10 adapted to be recessed in the floor of the vehicle with all of the operating components contained within the hollow interior 11 of the housing when the devices are in the retracted position.

The basic parts of each locking device comprise a locking arm 12, an elongated actuating link 13, and a pivot link 14 interconnecting the locking arm 12 and the actuating link 13, the pivot link 14 in the retracted position being received in a slot 15 in the locking arm 12 and in a slot 16 in the actuating link 13. Locking arm 12 has a neck portion 18 of reduced width which mounts rollers 19 and 20.

As seen in FIG. 2, a pivot pin 21 pivotally connects the end of locking arm 12 to the housing 10, and similarly a pivot pin 22 pivotally connects one end of the pivot link 14 to the locking arm adjacent the innermost end of slot 15. A pivot pin 23 connects the opposite end of pivot link 14 to actuating link 13, but in this instance the pivot pin is received in an elongated slot 24 which permits limited axial movement of the actuating link 13 relative to pivot link 14, such limited movement permitting the actuating link to cam the adjoining end of the locking arm upwardly, as will be explained in greater detail hereinafter.

The handle member 17 is pivotally connected to the reduced width neck portion 18 of actuating link 13 by means of a pivot pin 27 which pin also mounts the latch member 28 received in slot 29 extending inwardly from the neck portion of the actuating link. A spring 30 acts to bias the latch member 28 for movement in a counterclockwise direction, as viewed in FIGS. 3 through 5.

Referring next to FIG. 4, when it is desired to erect the locking arm, the attendant first pivots the handle member 17 upwardly, thereby providing a pusher by means of which the actuating link 13 may be caused to move axially along the hollow interior of the channel-shaped housing. As such movement is initiated, the leading edge 31 of actuating link 13 will contact the undercut surface 32 of neck portion 18 of locking arm 12, thereby camming the end of locking arm 12 upwardly in the manner seen in FIG. 4. Such movement is permitted by the elongated slot 24 in which pivot pin 23 is received. When pivot pin 23 contacts the rear edge of slot 24, continued movement of the actuating link 13 causes pivot link 14 to urge the locking arm 12 upwardly, the locking arm pivoting about pivot pin 21 until the parts reach the position illustrated in FIG. 5, which is the fully erected position.

As the actuating link 13 is moved lengthwise along the channel-shaped housing 10, the nose 33 of latch member 28 approaches a slot 34 in the undersurface of the housing 10, and when the locking arm 12 reaches the fully erected condition, the nose 33 of the latch member will overlie the slot 34 and will be urged downwardly into the slot by the spring 30. The latch will remain in the locked position until the distal end 35 of the latch member is pressed downwardly by the attendant to release the latch. In this connection, it will be noted that handle member 17 has a pocket 36 on its underside which receives the distal end of the latch when the handle is pivoted to its retracted position. Thus, and as seen in FIG. 5, the retracted handle overlies and protects the latch against accidental displacement, it being necessary for the operator to lift the handle in order to release the latch.

As should now be evident, when it is desired to retract the locking arm, the attendant lifts the handle, releases the latch, and pulls rearwardly on the handle, thereby moving the actuating link 13 in the opposite direction, such movement causing the pivot link 14 to pivot the locking arm 12 to its retracted position.

Referring next to FIGS. 6 through 8, each of the wing-like fixtures 8 and 9 comprises a wing member 37 having spaced apart wings 38 and 39, the member 37 having a serrated rear face 40 which engages an adjustment member 41 which is serrated on both sides, the opposite side of the adjustment member engaging the serrated face 42 of bracket member 43 which, along with its coacting bracket member 44, defines a tubular sleeve which surrounds and engages the tubular member 45 which defines an end of the cot undercarriage 5. As seen in FIG. 7, the outlying sets of bolts 46 extend through and join together the sleeve defining brackets 43 and 44. Intermediate bolts 47, which are longer than the bolts 46, extend not only through the brackets 43 and 44 but also through the adjustment member 41 and wing member 37. To this end, the serrated adjustment member 41 is of frame-like configuration, having a relatively large center opening, indicated by the dotted line 48 in FIG. 7. The wing member 37 has a centrally disposed slot 49 of the size to receive the threaded shanks of bolts 47. An additional bolt hole 50 is provided adjacent the lower end of bracket member 43 to permit a wide range of adjustment between the wing member 37 and the bracket members to which it is secured. For example, if the wings are too high when in the position illustrated in FIG. 6, the upper bolt 47 may be removed and the wing member 37 and adjustment member 41 moved downwardly as required, with the removed bolt inserted in the additional bolt hole 50. If the wings are too low, the wing member 37 may be removed and reversed so that the wings 38 and 39 are uppermost. Bracket member 43 also may be reversed to extend the range of adjustment even further, thereby accommodating the locking devices to cots having a wide range of wheel sizes.

As will be evident from FIGS. 6 and 7, the wings 38 and 39 are tapered upwardly from front to rear, as indicated at 51 in FIG. 6, and are also tapered upwardly from their outer to their inner edges, as indicated at 52 in FIG. 7. Since the wing member 37 is reversible, the opposite sides of the wings are tapered in like manner, as indicated at 51a and 52a. As will be evident from FIG. 8, the leading edges 53 of the wings are inclined inwardly and hence act to guide the narrow neck 18 of the locking arm into the opening 54 between the wings as the locking arm and wing member assume the locked position.

With the arrangement just described, it will be evident that the locking arms 12 will firmly secure the cot in place. The front and rear sides of the undercarriage are effectively clamped between the locking arms and hence the cot cannot move either forwardly or rearwardly, nor can it move sidewise due to the snug engagement of the neck portions of the locking arms in the openings 54 between the wings 38 and 39. The engagement of the rollers 19 and 20 with the upper surfaces of the wings locks the cot to the floor of the vehicle, and even if the vehicle is turned over in an accident, the cot will remain clamped to the floor irrespective of its position. In connection with the stability of the locking devices, and as will be seen in FIG. 7, the elongated actuating link 13 is provided with opposing shoulders 55 and 56 extending along its opposite side edges, the shoulders underlying the inwardly directed flanges 57 and 58, respectively, forming a part of the housing 10. The actuating link 13 is thus free for axial movement in the housing but cannot be displaced upwardly relative to the housing. It also may be noted that the sliding movement of the actuating link may be facilitated by configuring its undersurface to provide skids 59 which minimize frictional contact between the actuating link and the bottom of the housing.

Modifications may be made in the invention without departing from its spirit and purpose, and it is not intended that the scope of the invention be limited other than in the manner set forth in the claims which follow.

The embodiments of the invention in which an exclusive property or privilege is claimed are defined as follows:

1. An ambulance cot fastener adapted to be recessed in the floor of an ambulance comprising an elongated channel-shaped housing having a hollow interior, a locking arm pivotally connected at one end to said housing adjacent one end thereof, said locking arm being pivotally movable from a retracted position in which it is contained within the hollow interior of said housing to an extended position in which it extends upwardly from said housing, an elongated actuating link slidably mounted within the hollow interior of said housing for movement toward and away from said locking arm, and a pivot link interconnecting said locking arm and said actuating link, said pivot link being pivotally connected at one end to said locking arm at a point remote from the pivotal connection of said locking arm to said housing and pivotally connected at its opposite end to said actuating link, whereby movement of said actuating link towards said locking arm causes said pivot link to move said locking arm from its retracted to its extended position, and movement of said actuating link in the opposite direction will cause said pivot link to move said locking arm to its retracted position, said pivot link lying with the hollow interior of said housing when said locking arm is in its retracted position.

2. The ambulance cot fastener claimed in claim 1 including locking means operatively connected to said actuating link for fixedly securing said actuating link against movement relative to said housing when said locking arm is in its extended position.

3. The ambulance cot fastener claimed in claim 2 wherein said locking means comprises a spring biased latch member pivotally connected to said actuating link, said latch member having a nose portion adapted to engage a slot in said housing when said locking arm is in its extended position.

4. The ambulance cot fastener claimed in claim 3 wherein said actuating link has a leading end facing said locking arm and a trailing end facing in the opposite direction, wherein said latch member has a distal end projecting rearwardly beyond the trailing end of said actuating link, and a handle member pivotally connected to the trailing end of said actuating link, said handle being movable from a retracted position in which it overlies and covers the distal end of said latch member to an upright position in which it projects upwardly from said actuating link.

5. The ambulance cot fastener claimed in claim 4 wherein the opposite end of said locking arm is undercut to define a cam surface engageable by the leading end of said actuating link, one of the pivotal connections between said pivot link and the members to which it is connected being sufficiently loose to permit the leading end of said acutating link to contact the undercut edge of said locking arm when in the retracted position and displace it upwardly as movement of said actuating link towards said locking arm is initiated.

6. The ambulance cot fastener claimed in claim 1 including cot engaging means mounted on the opposite end of said locking arm, in combination with coacting arm engaging means adapted to be mounted on a cot being fastened.

7. The ambulance cot fastener claimed in claim 6 wherein said cot engaging means comprises rollers, and wherein said coacting arm engaging means comprises a fixture having a wing member positioned to be engaged by said rollers.

8. The ambulance cot fastener claimed in claim 7 wherein said locking arm has a neck portion, wherein said wing member has a pair of spaced apart wings defining an opening therebetween of a size to receive the neck portion of said locking arm, said rollers being mounted to engage said wings on opposite sides of said opening.

9. The ambulance cot fastener claimed in claim 8 wherein the leading edges of said wings are tapered inwardly toward the opening therebetween to guide the neck of said locking arm into said opening.

10. The ambulance cot fastener claimed in claim 9 wherein the surfaces of said wings contacted by said rollers are inclined upwardly from their leading edges to exert a camming action on said rollers.

11. The ambulance cot fastener claimed in claim 10 wherein said fixture includes a bracket means engageable with the cot, said bracket means including a serrated face, a serrated face on said wing member, and means for adjustably securing said serrated faces together.

12. The ambulance cot fastener claimed in claim 11 wherein the serrated face on said wing member is elongated, wherein said wings arepositioned toward one end of said elongated face, and wherein both the upper and lower surfaces of said wings are tapered, whereby the wing member may be reversed relative to said bracket means to increase its range of adjustment.

13. The ambulance cot fastener claimed in claim 12 wherein the serrated face on said bracket means is also elongated and projects predominantely from one side of said bracket means, whereby said bracket means may be reversed relative to said wing member to further increase its range of adjustment.

14. The ambulance cot fastener claimed in claim 13 including a frame-like adjustment member between said serrated faces, said adjustment member being serrated on its opposite faces and adjustable relative to said serrated faces to accommodate them to each other throughout their full range of adjustment.

15. In combination with an ambulance cot fastener having a locking arm movable from a retracted to an extended position and means for securing said locking arm in its extended position, a fixture adapted to be mounted on an ambulance cot for engagement by said locking arm when in its extended position, said fixture comprising bracket means engageable with the cot, a wing member mounted on said bracket means, said wing member having a spaced apart pair of wings defining an opening therebetween of a size to receive said locking arm, said locking arm including wing engaging means positioned to contact the upper surfaces of said wings when said locking arm is received in said opening, the leading edges of said wings being configured to guide the locking arm into said opening.

16. The device claimed in claim 15 wherein said bracket means includes a serrated face, an opposing serrated face on said wing member, and means for adjustably securing said serrated faces together.

17. The device claimed in claim 16 wherein the serrated face on said wing member is elongated, wherein said wings are mounted toward one end of said elongated face, whereby the wing member may be reversed relative to said bracket means to increase its range of adjustment.

18. The device claimed in claim 15 wherein the serrated face on said bracket means is elongated and projects predominately from one side of said bracket means, whereby said bracket means may be reversed relative to said wing member to increase its range of adjustment.

19. The device claimed in claim 15 wherein the surfaces of said wings contacted by said wing engaging means are inclined upwardly from their leading edges to exert a camming action on said wing engaging means.

* * * * *